(12) United States Patent
Miyata (10) Patent No.: US 8,411,166 B2
(45) Date of Patent: Apr. 2, 2013

(54) DIGITAL CAMERA FOR RECORDING STILL IMAGE WITH SPEECH

(75) Inventor: Akira Miyata, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 400 days.

(21) Appl. No.: 12/725,652

(22) Filed: Mar. 17, 2010

(65) Prior Publication Data

US 2010/0238304 A1 Sep. 23, 2010

(30) Foreign Application Priority Data

Mar. 18, 2009 (JP) ................. 2009-066791

(51) Int. Cl.
*H04N 5/76* (2006.01)
(52) U.S. Cl. .................. 348/231.4; 348/231.3
(58) Field of Classification Search .......... 348/231.4
See application file for complete search history.

(56) References Cited

U.S. PATENT DOCUMENTS

| | | | | |
|---|---|---|---|---|
| 7,512,335 | B2 * | 3/2009 | Funakura | 396/310 |
| 7,668,455 | B2 * | 2/2010 | Ono et al. | 396/312 |
| 8,125,539 | B2 * | 2/2012 | Takashima | 348/231.6 |
| 2006/0155549 | A1 | 7/2006 | Miyazaki | |
| 2009/0041428 | A1 | 2/2009 | Jacoby et al. | |

FOREIGN PATENT DOCUMENTS

| | | |
|---|---|---|
| JP | 2000-78516 A | 3/2000 |
| JP | 2004-23160 A | 1/2004 |
| JP | 2004-297177 A | 10/2004 |
| JP | 2005-017932 A | 1/2005 |
| JP | 2006-197115 A | 7/2006 |
| JP | 2006-203860 A | 8/2006 |
| JP | 2006-238219 A | 9/2006 |
| JP | 2006-310978 A | 11/2006 |
| WO | WO 2009/020515 A1 | 2/2009 |

OTHER PUBLICATIONS

Japanese Office Action dated May 22, 2012 and English translation thereof in counterpart Japanese Application No. 2011-053660.
Japanese Office Action dated Jan. 18, 2011 (and English translation thereof) in counterpart Japanese Application No. 2009-066791.
Japanese Office Action dated May 31, 2011 (and English translation thereof) in counterpart Japanese Application No. 2009-066791.

* cited by examiner

*Primary Examiner* — Anthony J Daniels
(74) *Attorney, Agent, or Firm* — Holtz, Holtz, Goodman & Chick, P.C.

(57) ABSTRACT

An image pickup method includes determining a start timing and an end timing of obtaining the speech to have a photographing timing of the still image taken by the image pickup unit therebetween, in accordance with a period in which the speech stored in the temporary speech storing unit satisfies a predetermined condition, and cutting out the speech stored in the temporary speech storing unit for a period from the start timing to the end timing determined, and storing the cut speech in the storing unit in association with the still image taken by the image pickup unit.

4 Claims, 6 Drawing Sheets

DIGITAL CAMERA FOR RECORDING STILL IMAGE WITH SPEECH

CROSS-REFERENCE TO RELATED APPLICATIONS

This application is based upon and claims the benefit of priority from prior Japanese Patent Application No. 2009-066791, filed Mar. 18, 2009, the entire contents of which are incorporated herein by reference.

BACKGROUND OF THE INVENTION

1. Field of the Invention

The present invention relates to a digital camera, image pickup method, and a storage medium storing program code, capable of recording speech together with a still image at the time of taking the still image.

2. Description of the Related Art

Conventionally, a digital camera capable of storing speech data together with a still image at the time of taking the still image, and recording image data of the obtained still image and the speech data in association with each other as a single data file, is known.

In the camera of this type, storage of the speech is started at a photographing timing of the still image caused by a shutter key operation as a trigger, and the storage of the speech is stopped at the time when the shutter key is operated again or a maximum limit time (for example, 10 [seconds]) elapses, and the obtained speech data are recorded in association with the image data of the still image under standards of DCF (Design rule for Camera File system).

In addition, a technique of not starting the storage at the photographing timing of the still image as stated above, but, while preliminarily updating the speech data in a buffer memory, continuing the storage and recording the speech data for a certain period before and after the photographing timing of the still image has been conceived (for example, Jpn. Pat. Appln. KOKAI Publications No. 2004-297177, No. 2006-310978, and No. 2000-78516).

According to prior art including this document, the timing of obtaining the speech data is constantly determined based on the photographing timing of an associated still image, i.e., the timing of pressing a shutter button. However, an optimum photographing timing of the still image does not always correspond to an optimum timing of obtaining the speech corresponding to the still image. At actual photographing, a part of speech considered necessary may be interrupted or the recording timing may be delayed.

Under the circumstances, it is desired to provide an image pickup apparatus capable of, upon taking a still image with speech, appropriately controlling a start timing and an end timing of obtaining the speech, not only based on the photographing timing of the still image, but also according to a situation.

BRIEF SUMMARY OF THE INVENTION

According to one aspect of the present invention, there is provided an image pickup apparatus, comprising: an image pickup unit configured to take a still image; a temporary speech storing unit configured to input speech and continue storing speech for a predetermined time length while updating the speech; a speech period determining unit configured to determine a start timing and an end timing of obtaining the speech to have a photographing timing of the still image taken by the image pickup unit therebetween, in accordance with a period in which the speech stored in the temporary speech storing unit satisfies a predetermined condition; a storing unit configured to store the still image taken by the image pickup unit, and the speech; and a storage control unit configured to cut out the speech stored in the temporary speech storing unit for a period from the start timing to the end timing determined by the speech period determining unit, and store the cut speech in the storing unit in association with the still image taken by the image pickup unit.

According to another aspect of the present invention, there is provided an image pickup method for an image pickup apparatus including an image pickup unit configured to take a still image, a temporary speech storing unit configured to continue storing speech for a predetermined time length while updating the speech, and a storing unit configured to store the still image taken by the image pickup unit, and the speech, the method comprising: determining a start timing and an end timing of obtaining the speech to have a photographing timing of the still image taken by the image pickup unit therebetween, in accordance with a period in which the speech stored in the temporary speech storing unit satisfies a predetermined condition; and cutting out the speech stored in the temporary speech storing unit for a period from the start timing to the end timing determined, and storing the cut speech in the storing unit in association with the still image taken by the image pickup unit.

According to still another aspect of the present invention, there is provided a storage medium storing program code to be executed by a computer built in an image pickup apparatus including an image pickup unit configured to take a still image, a temporary speech storing unit configured to continue storing speech for a predetermined time length while updating the speech, and a storing unit configured to store the still image taken by the image pickup unit, and the speech, the program code comprising: determining a start timing and an end timing of obtaining the speech to have a photographing timing of the still image taken by the image pickup unit therebetween, in accordance with a period in which the speech stored in the temporary speech storing unit satisfies a predetermined condition; and cutting out the speech stored in the temporary speech storing unit for a period from the start timing to the end timing determined, and storing the cut speech in the storing unit in association with the still image taken by the image pickup unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the accompanying drawings.

(1st Embodiment)

A first embodiment of the present invention applied to a digital camera will be described with reference to the drawings.

Figure 1:
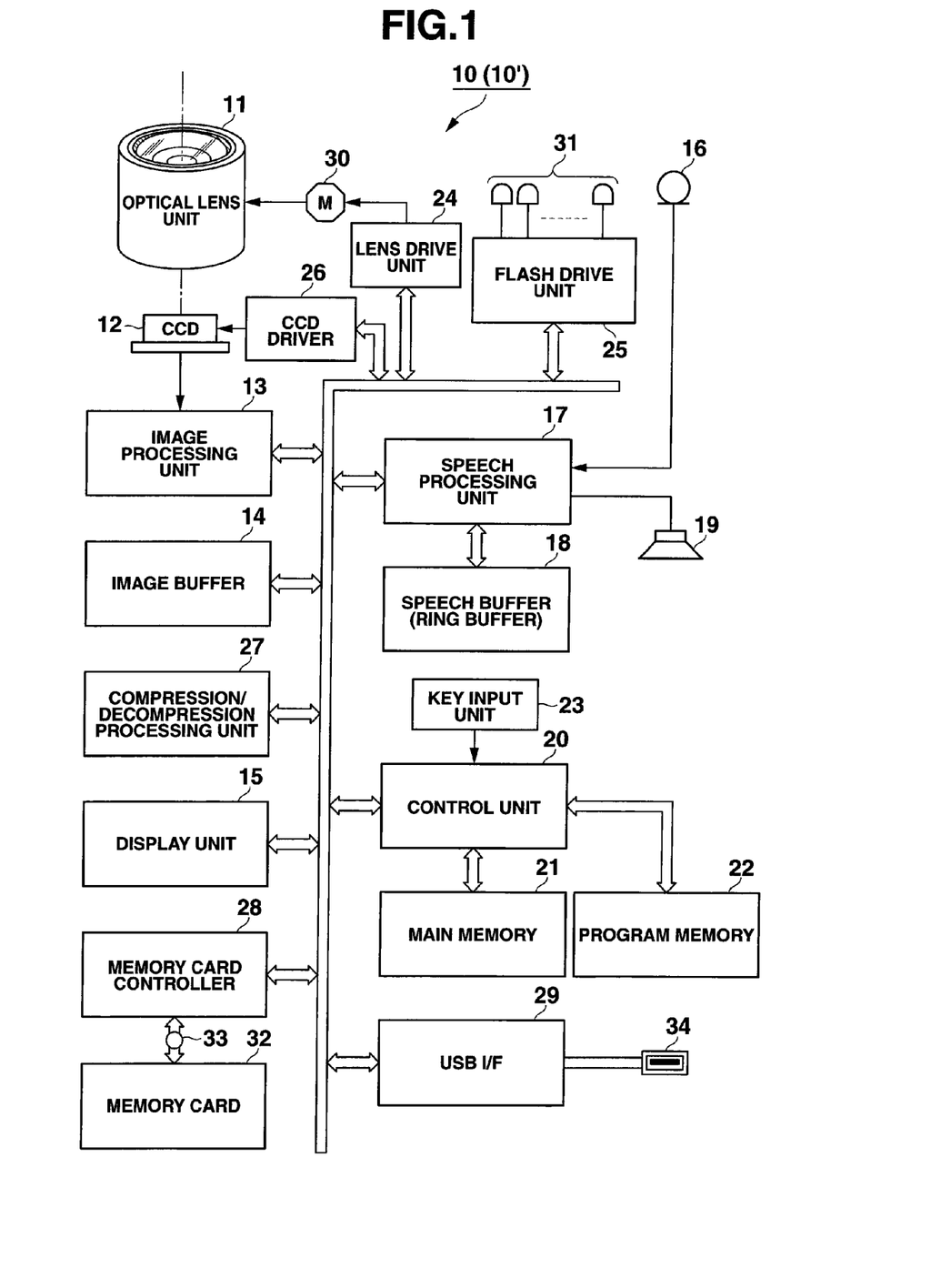
FIG. 1 is a block diagram showing a functional structure of an electronic circuit of a digital camera according to a first embodiment of the present invention.

FIG. 1 shows a circuit configuration of a digital camera 10 according to the embodiment. In the figure, an optical image of an object is formed on an imaging area of a CCD 12 which is a solid-state image sensor, by an optical lens unit 11 arranged on a front surface of a camera housing.

In a monitoring status which is also called through image display or live view image display, the digital camera 10 transmits an image signal obtained by the imaging of the CCD 12 to an image processing unit 13 in which the image signal is subjected to correlation square sampling, automatic gain adjustment and A/D conversion, thereby digitizing the image signal. The image processing unit 13 further subjects the image data of the digital value to color process including image interpolation and y control and urges an image buffer 14 to hold the image data temporarily via a system bus SB.

The digital camera 10 reads the image data held in the image buffer 14 to the image processing unit 13 via the system bus SB, transmits the image data to a display unit 15 via the system bus SB, and displays the image data as a through image.

In addition, a microphone 16 having an acoustic orientation to substantially the same level as an imaging angle of the optical lens unit 11 is arranged on the front surface of the camera housing, similarly to the optical lens unit 11, and speech in an object direction is input to the microphone 16. The microphone 16 converts the input speech into an electric signal and outputs the electric signal to a speech processing unit 17.

When speech is recorded, the speech processing unit 17 converts the speech signal input from the microphone 16 into digital data and urges a speech buffer 18 constituted by a ring buffer to store the speech data temporarily. Further, the speech processing unit 17 cuts out a part of the speech data stored in the speech buffer 18 as needed, creates a speech data file by compressing the speech data in a determined data file format, for example, AAC (moving picture experts group-4 Advanced Audio Coding), and transmits the speech data file to a storage medium to be described later.

In addition, the speech processing unit 17 includes a sound source circuit of PCM sound source, etc., and decompresses the speech data file transmitted upon reproduction of the speech and converts the decompressed speech data file into an analog signal, and drives a speaker 19 provided on a rear surface side of the digital camera 10 to output the speech.

The control unit 20 totally controls the above-described circuits and another circuits. The control unit 20 is constituted by a CPU and is directly connected to a main memory 21 and a program memory 22. The main memory 21 is constituted by an SDRAM (synchronous DRAM) and functions as a work memory. The program memory 22 is constituted by an electrically rewritable nonvolatile memory and fixedly stores operation programs including the control in a photographing mode to be described later, voice print data of a specific person, etc.

The control unit 20 reads necessary programs, data, etc. from the program memory 22, and executes the control operation of the entire digital camera 10 while decompressing and storing the programs, data, etc. in the main memory 21 arbitrarily and temporarily.

Further, the control unit 20 executes various types of control operations in response to a key operation signal which is directly input from a key input unit 23. The control unit 20 is connected to the image processing unit 13, image buffer 14 and display unit 15 via the system SB, and also connected to a lens drive unit 24, a flash drive unit 25, a CCD driver 26, a compression/decompression processing unit 27, a memory card controller 28, and a USB interface (I/F) 29.

The key input unit 23 includes, for example, a power key, a shutter key, a zoom key, a photographing mode key, a play mode key, a menu key, a cursor ("↑" "→", "↓", "←") key, a set key, a scene program key, etc.

The lens drive unit 24 receives a control signal from the control unit 20, controls rotation of a stepping motor (M) 30 for motor, and moves positions of some of a plurality of lenses constituting the optical lens unit 11, more specifically, positions of a focus lens and a zoom lens, separately, along an optical axis direction.

The flash drive unit 25 receives a control signal from the control unit 20 at the time of taking a still image, and drives a flash unit 31 constituted by a plurality of white high-brightness LED to be turned on in synchronization with a photographing timing.

The CCD driver 26 drives operations of the CCD 12 in accordance with photographing conditions, etc. set at this time.

The compression/decompression processing unit 27 subjects the image data held in the image buffer 14 in a predetermined data file format, for example, JPEG (Joint Photographic Experts Group) to data compression such as DCT (discrete cosine transform), Huffman coding, etc. and creates an image data file having data amount reduced, at the time of taking an image based on a shutter key operation of the key input unit 23. The created image data file is recorded in the memory card 32 via the system bus SB and the memory card controller 28.

In addition, the compression/decompression processing unit 27 receives image data read via the memory card controller 28 from the memory card 32, via the system bus SB, in the reproduction mode, obtains the image data of the original size in the decompression process in which decompression is executed in an opposite manner to that at the recording, and urges the image buffer 14 to hold the image data via the system bus SB. By the image data held in the image buffer 14, display for reproduction is executed on the display unit 15.

The memory card controller 28 is connected to a memory card 32 via a card connector 33. The memory card 32 is a memory for recording the image data, etc. which is mounted on the digital camera 10 so as to be detachable therefrom and serves as a storage medium of the digital camera 10. Inside the memory card 32, a flash memory which is a nonvolatile memory electrically rewriteable in a block unit, and a drive circuit for the flash memory are provided.

The USB interface 29 controls reception and transmission of data at the time of connecting the digital camera 10 with an external device, for example, a personal computer via a USB connector 34.

Next, operations of the above-described embodiment will be described.

The following operations are executed after the control unit 20 reads the operation programs and data stored in the program memory 22, and registered voice print data of speech of a specific person, and decompresses and stores the data in the main memory 21 upon taking a still image in the photographing mode.

Besides the operation programs stored in the program memory 22 when the camera 10 is shipped from a manufacturing factory, the operation programs, etc. stored in the program memory 22 include, for example, new operation programs, data, etc. downloaded from the outside via the USB connector 34 and the USB interface 29 and stored in the program memory 22 by connecting the digital camera 10 with a personal computer, when the digital camera 10 is upgraded.

In addition, the shutter key serving as a part of the key input unit 23 has two-step operation strokes, i.e., becomes in a photographing preparation status by the first-step operation stroke (hereinafter called "halfway press") to execute AF (autofocus) process and AE (autoexposure) process and lock a focusing position and an exposure value, and executes photographing by the second-step operation stroke (hereinafter called "full press").

Figure 2:
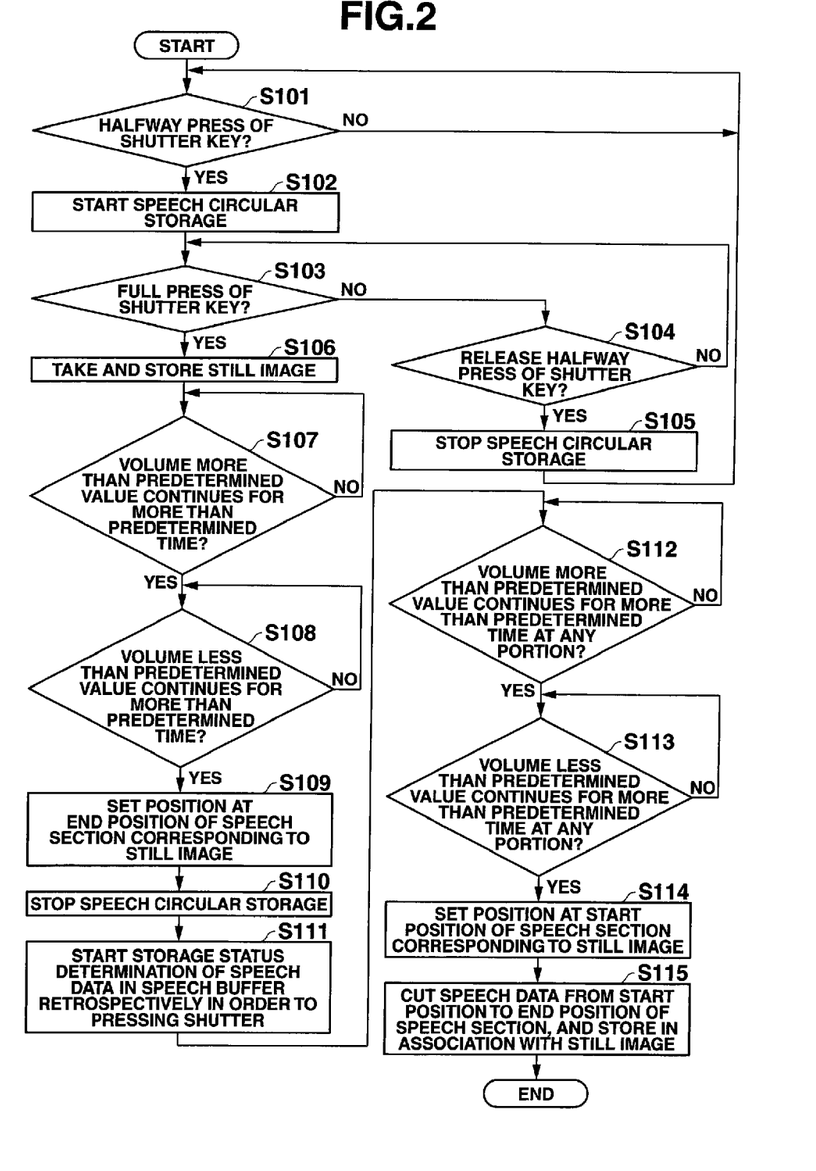
FIG. 2 is a flowchart showing a process upon taking a still image with speech according to the first embodiment.

FIG. 2 mainly shows processing of dealing with the speech data in the mode of photographing a speech-accompanied still image. First, it is awaited the shutter key of the key input unit 23 is subjected to the halfway-press operation by continuing determining whether or not the shutter key has been subjected to the halfway-press operation (step S101).

When the shutter key has been subjected to the halfway-press operation, the control unit 20 detects it in step S101, locks the focusing position and the exposure value as mentioned above, and starts circulating storage of speech by using the microphone 16, the speech processing unit 17, and the speech buffer 18 (step S102).

In the circulating storage of speech, the control unit 20 effectively uses the storage capacity of the speech buffer 18 constituted by the ring buffer, and temporarily stores speech data for a certain past time, for example, 30 seconds at any time by obtaining and storing new speech data while sequentially deleting old speech data.

The control unit 20 determines whether or not the shutter key of the key input unit 23 has been further subjected to the full-press operation, while continuing the circulating storage of speech (step S103). If the control unit 20 determines that the shutter key has not been subjected to the full-press operation, the control unit 20 determines whether or not the halfway-press operation status of the shutter key has been released (step S104).

If the halfway-press operation status of the shutter key is maintained, the control unit 20 returns the processing again to step S103. After that, the control unit 20 awaits that the shutter key is subjected to the full-press operation or the halfway-press status is released, by repeating the processing in steps S103 and S104.

If the halfway-press operation status of the shutter key is released, the control unit 20 detects it in step S104, stops the circulating storage status of speech in the speech buffer 18 (step S105), and returns the processing to step S101 to await that subsequently, the shutter key is subjected to the halfway-press operation again.

In addition, if the shutter key is subjected to the full-press operation while repeating the processing in steps S103 and S104, the control unit 20 detects it in step S103, executes main photographing of the still image on the basis of the focusing position and the exposure value locked at this time, compresses image data obtained by the photographing to a data file by the compression/decompression processing unit 27, and stores the data file in the memory card 32 (step S106).

Simultaneously with this, the control unit 20 executes a cutout process in accordance with the status of the speech data stored in the speech buffer 18 at this time. In other words, the control unit 20 awaits that the speech data stored in the speech buffer 18 at this time become in a status of continuing for more than a preset time, for example, more than 3 seconds at a sound pressure higher than the preset sound pressure (step S107).

When the control unit 20 determines that the speech data become in a status of continuing at a sound pressure higher than the preset sound pressure for more than a preset time, the control unit 20 awaits that the speech data stored in the speech buffer 18 become in a status of continuing for more than a preset time, for example, more than 10 seconds at a sound pressure lower than the preset sound pressure (step S108).

When the control unit 20 determines that the speech data become in a status of continuing at a sound pressure lower than the preset sound pressure for more than a preset time, the control unit 20 sets an end position of the speech data in the status of continuing at a sound pressure higher than the preset sound pressure for more than a preset time to be an end position of a section of the speech data corresponding to the photographed still image (step S109).

The control unit 20 stops the circulating storage of the speech data to the speech buffer 18 (step S110).

Next, the control unit 20 starts processing of determining the storage status of the speech data in the speech buffer 18, retrospectively in time series from the time when the shutter key is subjected to the full-press operation (step S111).

The control unit 20 searches a portion at which the speech data continue at a sound pressure higher than the preset sound pressure for more than a preset time, for example, more than 3 seconds in a process of the determination processing in a retrospective time (step S112).

Then, the control unit 20 searches a portion at which the speech data continue at a sound pressure lower than the preset sound pressure for more than a preset time, for example, more than 10 seconds, further retrospectively from a time position at which the speech data continue at a sound pressure higher than the preset sound pressure for more than a preset time (step S113).

If the control unit 20 detects the status in which the speech data continue at a sound pressure lower than a preset sound pressure for more than a preset time, the control unit 20 sets a start position at which the sound pressure is higher than the preset sound pressure to be a start position of a section of the speech data corresponding to the photographed still image (step S114).

Since the start position and the end position of the section of the speech data stored in the speech buffer 18 are thereby determined, the control unit 20 performs controls such that the speech processing unit 17 cuts out and compresses the speech data in the range, creates a speech data file associated with the still image stored in step S106 and the memory card controller 28 stores the created speech data file in the memory card 32 (step S115), and ends a sequence of the processing in FIG. 2.

In a case where the file name of the still image data stored in the memory card 32 is, for example, "CIMG0001.JPG", if the file of the speech data is stored in association with the still image data, the file may be set as, for example, "CIMG0001.AAC" by setting the file names to be the same as described above.

In this case, it can be understood that the file "CIMG0001.JPG" of the still image data stored in the JPEG format and the file "CIMG0001.AAC" of the speech data stored in the AAC format are associated with each other in terms of identifiers and having the same file name "CIMG0001". Therefore, at the reproduction, both the files may be read parallel from the memory card 32 and, while displaying the still image data by the display unit 15, the speech data corresponding thereto may be output from the speaker 19.

Figure 3A:
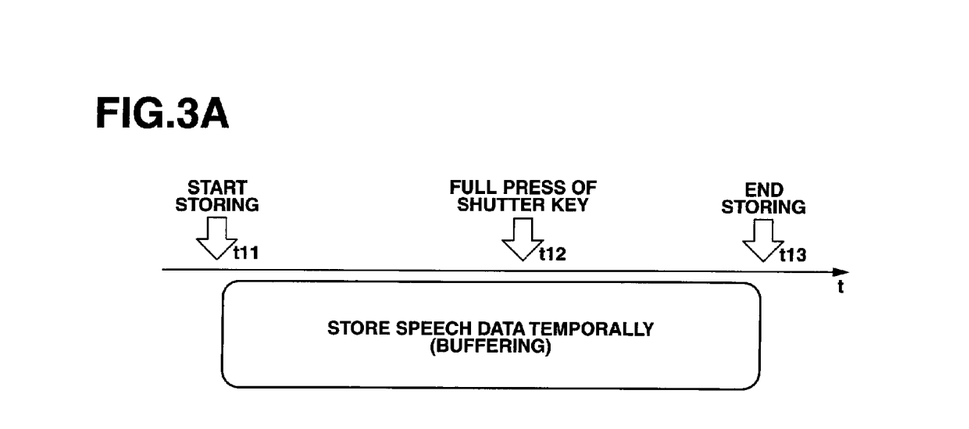
FIGS. 3A, 3B, and 3C are illustrations explaining obtaining and recording of speech data according to the first embodiment.
Figure 3B:
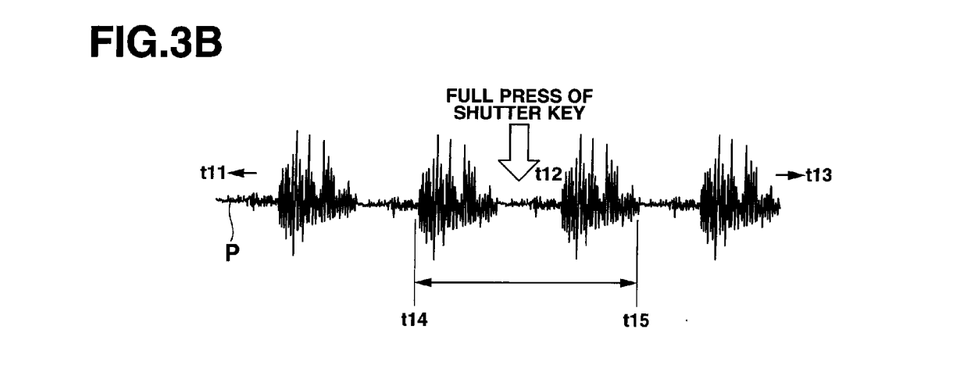
Figure 3C:
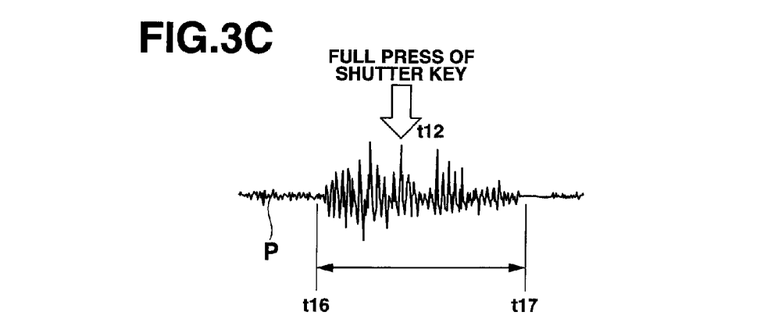

FIGS. 3A, 3B, and 3C illustrate a temporary storage of speech at the time of photographing the still image, and cutting out a speech section associated with the still image from the stored contents and storing the speech section. As shown in FIG. 3A, the temporary storage of the speech data in the speech buffer 18 is started at timing t11 at which the shutter key of the key input unit 23 is subjected to the halfway-press operation.

After that, the speech data are sequentially stored in the speech buffer 18. If the capacity of the speech buffer 18 is full of the speech data, then the old speech data are deleted, and new speech data input at this time are stored simultaneously. As a result, the speech buffer 18 continues storing the speech data for a certain time corresponding to the storage capacity thereof, at any time.

Then, after the shutter key is subjected to the full-press operation and photographing the still image is executed at timing t12, the speech buffer 18 continues storing the speech data. The storage is temporarily ended at timing t13 at which a certain time has elapsed after the speech is interrupted and the sound pressure is lower than the preset sound pressure.

The speech data of the above-described section are cut out for the speech data stored in the speech buffer 18.

FIG. 3B illustrates variation in sound pressure P in a case where the sound pressure of the speech data is lower than the preset sound pressure level at photographing timing t12 of the still image, and the sound pressure higher than the preset sound pressure level is maintained for more than a preset time at a timing before timing t12 and a timing after timing t12.

In this case, a start position located before photographing timing t12, of the section in which the sound pressure higher than the preset sound pressure level is maintained for more than the preset time, is set at start timing t14 of the speech section for storage, by the processing described in FIG. 2. Similarly, a terminal position located after photographing timing t12, of the section in which the sound pressure higher than the preset sound pressure level is maintained for more than the preset time, is set at end timing t15 of the speech section for storage.

As a result, a section from timing t14 to timing t15 including two sections in which the sound pressure higher than the preset sound pressure level is maintained for more than the preset time, before and after photographing timing t12 at which the shutter key is subjected to the full-press operation, is cut out as the speech data and stored in association with the still image data.

FIG. 3C illustrates variation in sound pressure P in a case where the sound pressure of the speech data is higher than the preset sound pressure level and is maintained for more than a preset time at photographing timing t12 of the still image.

In this case, a start position of the section in which photographing timing t12 is present and the sound pressure higher than the preset sound pressure level is maintained for more than the preset time, is set at start timing t16 of the speech section for storage, by the processing described in FIG. 2. Similarly, a terminal position of the section in which photographing timing t12 is located and the sound pressure higher than the preset sound pressure level is maintained for more than the preset time, is set at end timing t17 of the speech section for storage.

As a result, a section from timing t16 to timing t17 including photographing timing t12 at which the shutter key is subjected to the full-press operation, and including the section in which the sound pressure higher than the preset sound pressure level is maintained for more than the preset time, is cut out as the speech data and stored in association with the still image data.

In the operation example shown in FIG. 2, it is assured that even when no speech is present at the photographing timing, at least the speech data for more than 3 seconds before and after the photographing timing are stored in association with the still image. It is also assured that the stored speech data do not include an interruption of speech for more than 10 seconds. However, occurrence of an interruption of speech for 20 seconds at maximum before and after the photographing timing may be permitted.

In addition, in each of steps S107 and S112, it is awaited that the speech data become in the status of continuing at a sound pressure higher than the preset sound pressure, for more than the preset time, for example, more than 3 seconds. However, if the speech in the status of being higher than the predetermined sound pressure is not detected even when the wait status elapses for more than, for example, 20 seconds, the wait status may be released and the storage of the speech data may be stopped.

Thus, it is possible to prevent speech data which are generated at a timing quite indifferent from the photographing timing and which has no continuity with the speech at the photographing time from being stored in association with the still image.

Similarly, in each of steps S108 and S5113, it is awaited that the speech data become in the status of continuing at a sound pressure lower than the preset sound pressure, for more than the preset time, for example, more than 10 seconds. However, if the determined status is not detected after, for example, more than 30 seconds have elapsed, the storage of the speech data may be stopped. Thus, it is possible to limit the maximum length of the speech data stored in association with a single still image and prevent speech data from extending unexpectedly.

Further, in the operation example, the wait time is 3 seconds, 10 seconds, 3 seconds and 10 seconds in order. However, each time may be set arbitrarily in accordance with the photographing conditions.

According to the embodiment, as described above in detail, the start timing and end timing of obtaining the speech are not determined constantly based on the only photographing timing of the still image, but can be controlled appropriately in accordance with the photographing conditions, at the time of photographing the still image with speech.

In addition, in the above-described embodiment, the start timing and end timing of obtaining the speech are determined in accordance with a period in which the sound pressure of the speech stored in the speech buffer 18 is kept higher than a predetermined level. Atmosphere at the photographing time can be reproduced with more fidelity.

Further, in the above-described embodiment, as shown in FIG. 3B, even if the speech of an appropriate sound pressure cannot be obtained at the timing of executing the photographing, the timing is extended to sections before and after the timing in which an appropriate sound pressure is obtained and then the speech is stored. The conditions at the photographing can be therefore reproduced naturally with high fidelity.

(2nd Embodiment)

A second embodiment of the present invention applied to a digital camera will be described with reference to the drawings.

Since a circuit configuration of a digital camera 10' according to the present embodiment is basically the same as that shown in FIG. 1, the same portions are denoted by the same reference numbers, and their illustration and explanation are omitted.

In addition, in the present embodiment, voice prints of a plurality of persons can be preliminarily registered in the program memory 22. The speech processing unit 17 includes analyzing function of comparing voice prints of persons registered in the program memory 22 with a voice print in the speech data input from the microphone 16 and stored in the speech buffer 18.

The speech processing unit 17 further includes various speech processing functions such as an analyzing function of determining whether or not the speech input from the microphone 16 includes voice of person at a level higher than the predetermined sound pressure level.

Next, operations of the above-described embodiment will be explained.

The following operations are executed after the control unit 20 reads the operation programs and data stored in the program memory 22, and registered voice print data of speech of a specific person, and decompresses and stores the data in the main memory 21 upon taking a still image in the photographing mode.

Besides the operation programs stored in the program memory 22 when the camera 10 is shipped from a manufacturing factory, the operation programs, etc. stored in the program memory 22 include, for example, new operation programs, data, etc. downloaded from the outside via the USB connector 34 and the USB interface 29 and stored in the program memory 22 by connecting the digital camera 10 with a personal computer, when the digital camera 10 is upgraded.

Figure 4:
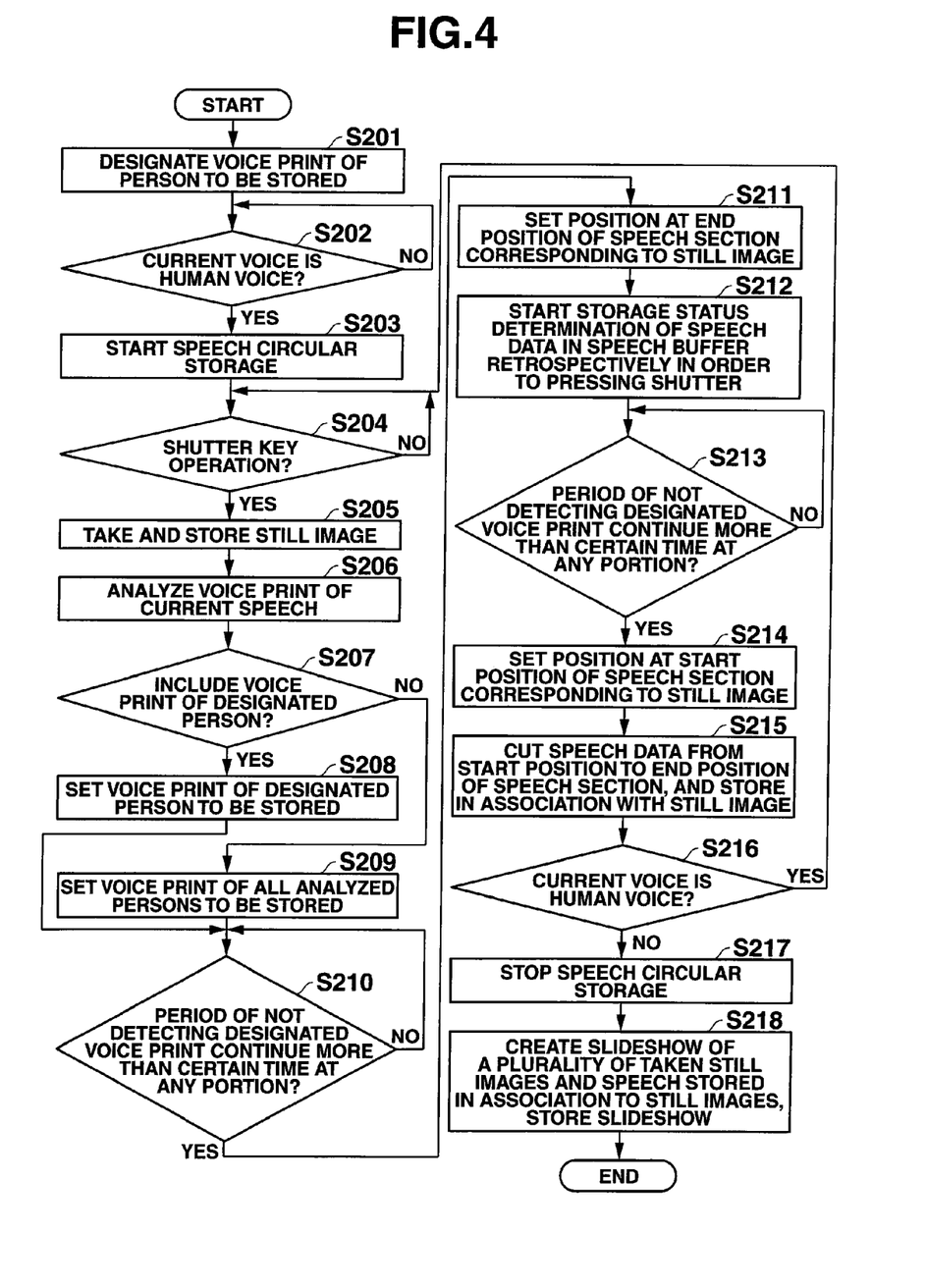
FIG. 4 is a flowchart showing a process upon taking a still image with speech according to a second embodiment of the present invention.

FIG. 4 mainly shows processing of dealing with the speech data in the mode of photographing a speech-accompanied still image.

First, the control unit 20 selects a voice print of a person whose speech is to be stored with photographing of a still image, from voice prints of persons preliminarily registered in the program memory 22 and designated (step S201).

At the designation of the voice print, the control unit 20 displays a list of the names of persons of the registered voice prints on the display unit 15 together with a guide message urging a key operation by the key input unit 23 to designate any one of the voice prints. When the name of person is selected by a predetermined key operation, the voice print of the selected name of person is designated.

After that, the control unit 20 determines by the speech processing unit 17 whether or not the speech input from the microphone 16 includes human voice (step S202).

The speech processing unit 17 analyzes a frequency spectrum of the speech input from the microphone 16, and determines whether or not the speech includes human voice by determining whether or not a detection level in a frequency band specific to human voice, higher than a predetermined value, can be obtained.

In step S202, the control unit 20 awaits that human voice is included in the speech, by repeating the same processing until the control unit 20 determines that the speech input from the microphone 16 includes human voice.

If the control unit 20 determines in step S202 that human voice is included in the speech, the control unit 20 starts the circulating storage of the speech by using the microphone 16, the speech processing unit 17, and the speech buffer 18 (step S203).

In the circulating storage of speech, the control unit 20 effectively uses the storage capacity of the speech buffer 18 constituted by the ring buffer, and temporarily stores speech data for a certain past time, for example, 30 seconds at any time by obtaining and storing new speech data while sequentially deleting old speech data.

The control unit 20 determines whether or not the shutter key of the key input unit 23 has been operated, while continuing the circulating storage of speech (step S204). The control unit 20 awaits that the shutter key is operated while continuing the storage of the speech data, by repeating the same processing until the control unit 20 determines that the shutter key of the key input unit 23 has been operated.

If the shutter key is operated, the control unit 20 detects it in step S204, executes main photographing of the still image, compresses the image data obtained by the photographing to a data file by the compression/decompression processing unit 27, and stores the data file in the memory card 32 (step S205).

Simultaneously with this, the control unit 20 analyzes the speech input from the microphone 16 at this time (step S206). As a result of the analysis, the control unit 20 determines whether or not the current speech includes the voice print of the person designated in step S201 (step S207).

If the control unit 20 determines that the speech includes the voice print of the designated person, the control unit 20 sets the voice print of the designated person as the voice print to be stored, as designated in step S201 (step S208).

If the control unit 20 determines in step S207 that the speech does not include the voice print of the designated person, the control unit 20 sets the voice prints of all the analyzed persons as voice prints to be stored (step S209).

After that, the control unit 20 repeatedly determines whether or not a period in which the voice prints of the persons to be stored as set in step S208 or step S209 cannot be detected is a certain period, for example, more than 10 seconds (step S210).

When the control unit 20 determines that the period in which the voice prints of the persons to be stored as set in step S208 or step S209 cannot be detected is more than a certain period, the speech of the persons to be stored is considered to be interrupted for more than a certain time. Thus, the control unit 20 sets the time when the voice print of the person to be stored can be detected at the last time as an end position of a section of the speech data corresponding to the photographed still image (step S211).

Next, the control unit 20 starts processing of determining the storage status of the speech data in the speech buffer 18, retrospectively in time series from the time when the shutter key is subjected to the full-press operation (step S212).

The control unit 20 searches a portion at which the detection of the designated voice print continues for a preset time, for example, more than 3 seconds in a process of the determination processing in a retrospective time (step S213).

The control unit 20 sets a start position in the status in which the detection of the designated voice print continues for more than a preset time as a result of the searching to be a start position of the section of the speech data corresponding to the photographed still image (step S214).

Since the start position and the end position of the section of the speech data stored in the speech buffer 18 are thereby determined, the control unit 20 performs controls such that the speech processing unit 17 cuts out and compresses the speech data in the range, creates a speech data file associated with the still image stored in step S205 and the memory card controller 28 stores the created speech data file in the memory card 32 (step S215).

After that, the control unit 20 further determines by the speech processing unit 17 whether or not the speech input from the microphone 16 includes human voice at this time (step S216).

If the control unit 20 determines that the speech input from the microphone 16 includes human voice, the control unit 20 returns the processing to step S204 to take a next still image subsequently.

Thus, the control unit 20 repeatedly executes the processing of steps S204 to S216 while the speech input from the microphone 16 includes human voice.

If the control unit 20 determines that the speech input from the microphone 16 does not include human voice, the control unit 20 stops the circulating storage of the speech data to the speech buffer 18 (step S217).

After that, on the basis of a plurality of photographed still image data items and the speech data stored to correspond to each of the still image data items, independent of the data file of each of the stored still images, the control unit 20 creates a single image file to reproduce them as a slideshow, for example, a motion JPEG file having an identifier represented as ".AVI" and stores it in the memory card 32 (step S218), and ends a sequence of the processing shown in FIG. 4.

Figure 5:
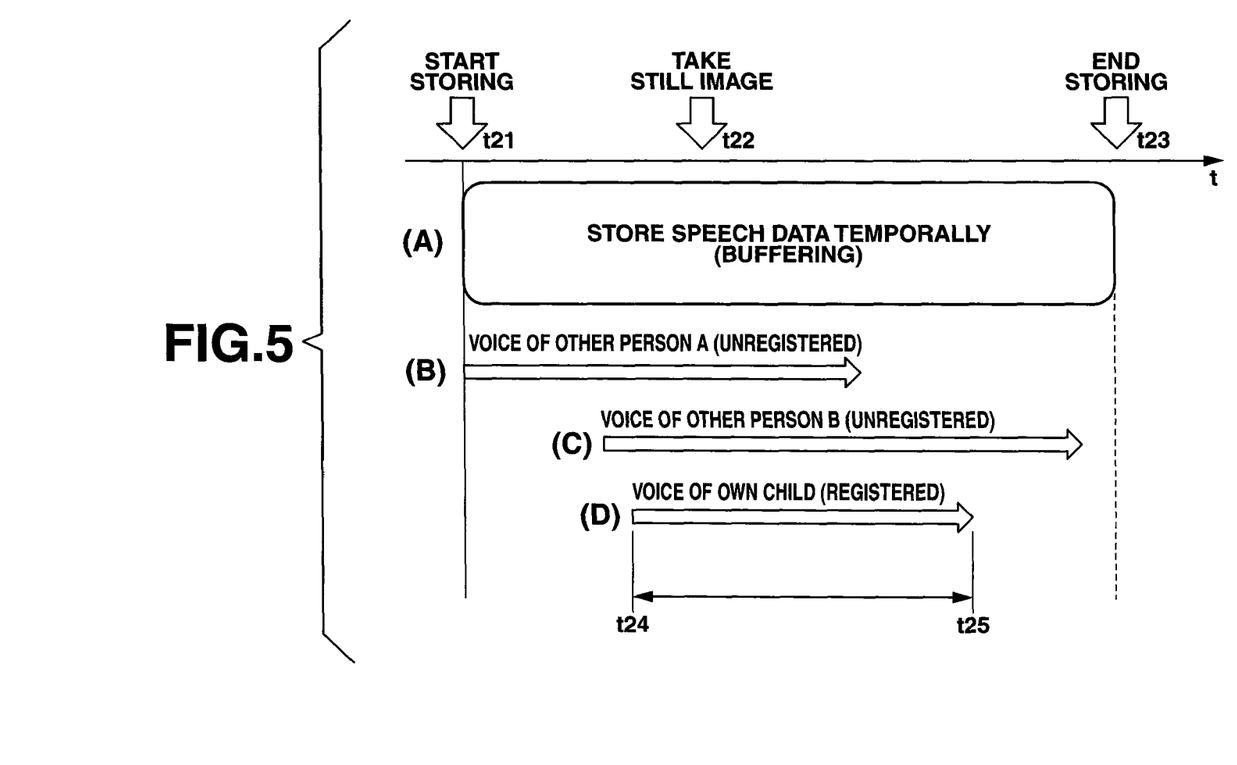
FIG. 5 is an illustration explaining obtaining and recording of speech data according to the second embodiment.

FIG. 5 illustrates a temporary storage of the speech at the time of photographing a still image, and a case where the speech section associated with the still image is cut out from the stored contents and is stored.

As shown in FIG. 5(B), at timing t21 at which human voice is input and recognized by the speech processing unit 17, temporary storage of the speech data in the speech buffer 18 is started. However, since the human voice recognized at this time is voice of other person A that is unregistered preliminarily, the human voice is not determined as speech data to be stored.

After that, the speech data are sequentially stored in the speech buffer 18. If the capacity of the speech buffer 18 is full of the speech data, then the old speech data are deleted and new speech data input at this time are stored simultaneously. As a result, the speech buffer 18 continues storing the speech data for a certain time corresponding to the storage capacity thereof, at any time.

Then, it is assumed that voice of unregistered other person B as shown in FIG. 5(C), and voice of my own child which has been registered as shown in FIG. 5(D) and is designated in the beginning of the processing shown in FIG. 4 are input sequentially with a time difference.

After that, while voice of registered/unregistered persons is input after the shutter key is operated at timing t22 to execute the photographing of the still image, the storage of the speech data in the speech buffer 18 is continued. Then, the storage is temporarily stopped at timing t23 at which the speech of human voice is interrupted and the sound pressure becomes lower than the preset sound pressure.

Thus, the speech data of the above-described section including photographing timing t22 is cut out for the speech data stored in the speech buffer 18.

In this case, since the voice of my own child which is designated preliminarily and registered is included in the speech as shown in FIG. 5(D) together with the photographing timing t22, the speech processing unit 17 analyzes and recognizes the voice of the child shown in FIG. 5(D), and sets a section from start timing t24 at which correspondence to the designated voice print is detected to terminal timing t25 at which the correspondence cannot be detected as the speech section for the storage.

As a result, a section from timing t24 at which inputting the voice corresponding to the designated voice print is started to timing t25 at which the input of the voice corresponding to the designated voice print is interrupted, including photographing timing t22 based on the operation of the shutter key, is cut out as the speech data and stored in association with the still image data.

In FIG. 5, if the input of the voice of my own child designated preliminarily shown in FIG. 5(D) cannot be detected, a section in which the designated voice print is not input, but the voice of the other person A shown in FIG. 5(B) or the voice of the other person B shown in FIG. 5(C) is input instead, is cut out and stored in association with the still image data.

Figure 6:
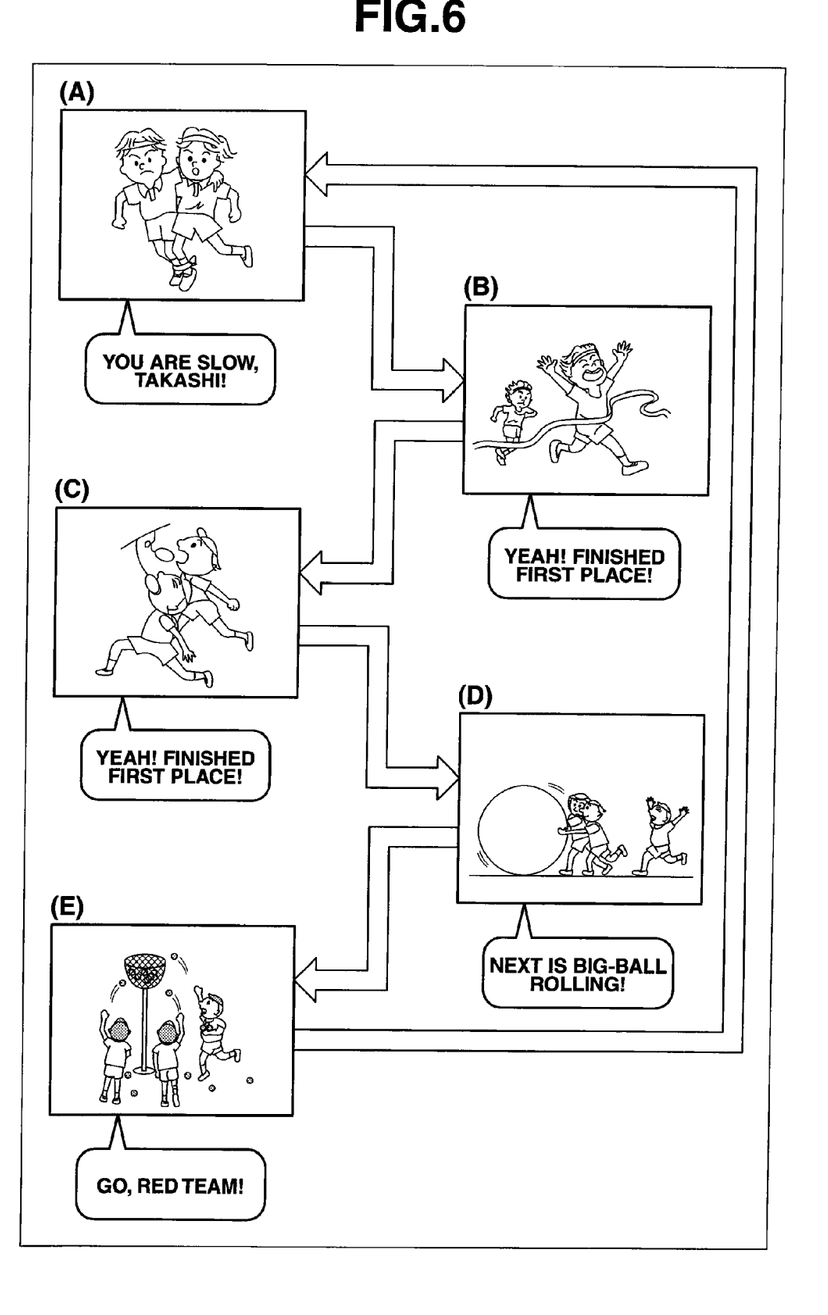
FIG. 6 is an exemplary illustration showing images for slideshow according to the second embodiment.

FIG. 6 illustrates an example of image data automatically created for slideshow display, in a case of turning on the power of the digital camera 10', continuing inputting human voice at any time, and continuing photographing the situation of an athletic meeting of children without interrupting the power, by the processing of FIG. 4.

In this case, if a still image is taken for each of events shown in FIG. 6(A) to FIG. 6(E) and the voice of the designated child is included in the speech data, a file of the speech data is created in association with the still image data, within a range in which the voice of the child is detected. If the voice of the designated child is not included in the speech data, a file of the speech data is created in association with the still image data, within a range in which the human voice is input continuously.

For this reason, when the voice of persons is completely interrupted, the image data for slideshow based on the still images shown in FIG. 6(A) to FIG. 6(E) and the speech corresponding thereto is created separately by the processing in step S218, and is stored in the memory card 32.

At the time of reproducing the image data for slideshow, reproduction of the still images shown in FIG. 6(A) to FIG. 6(E) and the speech corresponding thereto is continued circularly and endlessly until an instruction of stopping the reproduction is generated.

According to the present embodiment, as described above in detail, the start timing and the end timing of obtaining the speech are determined to correspond to the period in which the temporarily stored speech satisfies the predetermined conditions for being specific sound quality, for example, human voice. Therefore, by setting the sound quality suitable for the object, the start timing and the end timing of obtaining the speech can be controlled so as to correspond suitably to the situation.

In addition, in the above-described embodiment, human voice is designated as a specific sound quality. Therefore, operations for setting are easy for taking a snapshot, portrait, etc. in a case where a person is frequently used as the object, and efforts for obtaining the speech can be simplified remarkably.

In the above-described embodiment, when the voice of the specific person is detected by storing the voice print preliminarily, the section in which the voice is obtained can be set to be stored as the speech data. Therefore, the only speech data portion suitable for the object can be stored as the speech data in association with the data of the still image, separately from the voice of the other persons.

Further, in the above-described embodiment, when a plurality of still image data items are obtained in a sequence of the photographing process after obtaining the speech data is ended, the image data for slideshow is separately created from the data of a plurality of still images with speech and then stored. Therefore, slideshow data can be simply created without troubling the user, and the user can enjoy viewing the slideshow data.

In each of the first and second embodiments, the start timing and the end timing of obtaining the speech are determined to have the photographing timing of the still image therebetween, in accordance with the period in which the speech stored in the speech buffer 18 satisfies the predetermined conditions without exceeding a preset missing period. Therefore, the storage capacity of the speech buffer 18 can be used effectively, and the speech data can be efficiently stored according to the actual situation without including in the speech an unnecessary silent portion which is considered indifferent from the image.

The above-described embodiments are descried in a case where the present invention is applied to a digital camera. The present invention is not limited to this, but can also be applied to a video movie camera, a cellular telephone having a camera function, a mobile computer equipped with a web camera, and other types of electronic devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus, comprising: an image pickup unit configured to take a still image; a temporary speech storing unit configured to input speech and continue storing speech for a predetermined time length while updating the speech; a speech period determining unit configured to determine a start timing and an end timing of obtaining the speech to have a photographing timing of the still image taken by the image pickup unit therebetween, in accordance with a period in which sound quality of the speech stored in the temporary speech storing unit satisfies a predetermined condition; a storing unit configured to store the still image taken by the image pickup unit, and the speech; a storage control unit configured to cut out the speech stored in the temporary speech storing unit for a period within the start timing to the end timing determined by the speech period determining unit, and to store the cut out speech in the storing unit in association with the still image taken by the image pickup unit; and a registering unit configured to register a voice print of an arbitrary person in advance; wherein the storage control unit cuts out speech for a period in which a voice print of the speech corresponds to the voice print of the person registered in the registering unit.

2. The apparatus according to claim 1, further comprising an image reconstructing unit configured, when a plurality of still images associated with cut out speech are stored in the storing unit, to create a new image file including the still images accompanied with speech, and to store the new image file in the storing unit.

3. An image pickup method for an image pickup apparatus including an image pickup unit configured to take a still image, a temporary speech storing unit configured to continue storing speech for a predetermined time length while updating the speech, a registering unit configured to register a voice print of an arbitrary person in advance, and a storing unit configured to store the still image taken by the image pickup unit, and the speech, the method comprising: determining a start timing and an end timing of obtaining the speech to have a photographing timing of the still image taken by the image pickup unit therebetween, in accordance with a period in which sound quality of the speech stored in the temporary speech storing unit satisfies a predetermined condition; and cutting out the speech stored in the temporary speech storing unit for a period within the determined start timing to the determined end timing in which a voice print of the speech corresponds to the voice print of the person registered in the registering unit, and storing the cut out speech in the storing unit in association with the still image taken by the image pickup unit.

4. A non-transitory computer-readable storage medium storing a program code to be executed that is executable by a computer built in an image pickup apparatus including an image pickup unit configured to take a still image, a temporary speech storing unit configured to continue storing speech for a predetermined time length while updating the speech, a registering unit configured to register a voice print of an arbitrary person in advance, and a storing unit configured to store the still image taken by the image pickup unit, and the speech, the program being executable to cause the computer to perform functions comprising: determining a start timing and an end timing of obtaining the speech to have a photographing timing of the still image taken by the image pickup unit therebetween, in accordance with a period in which sound quality of the speech stored in the temporary speech storing unit satisfies a predetermined condition; and cutting out the speech stored in the temporary speech storing unit for a period within the determined start timing to the determined end timing in which a voice print of the speech corresponds to the voice print of the person registered in the registering unit, and storing the cut out speech in the storing unit in association with the still image taken by the image pickup unit.

* * * * *